United States Patent [19]

Weber et al.

[11] 3,910,754

[45] Oct. 7, 1975

[54] APPARATUS AND METHODS FOR HEAT TREATING FINE-GRAINED MATERIALS

[75] Inventors: Paul Weber, Oelde; Hans Mollenkopf; Kurt Henning, both of Neubeckum; Otto Heinemann, Ennigerloh; Heinz-Herbert Schmits, Rheda; Wolfgang Rother, Stromberg; Horst Ritzmann, Enniger; Jürgen Wurr, Ennigerloh; Karl Krutzner, Jr., Neubeckum; Werner Schössler, Ahlen; Wolf Goldmann; Georg Schepers, both of Ennigerloh, all of Germany

[73] Assignee: Polysius AG, Neubeckum, Germany

[22] Filed: May 13, 1974

[21] Appl. No.: 469,112

[30] Foreign Application Priority Data

May 15, 1973 Germany............................ 2324519

[52] U.S. Cl....................... 432/11; 34/10; 34/57 R; 432/14; 432/106
[51] Int. Cl.² ......................................... F27B 15/00

[58] Field of Search ................. 432/11, 14, 15, 106; 34/10, 57 R

[56] References Cited
UNITED STATES PATENTS

| | | | |
|---|---|---|---|
| 3,452,968 | 7/1969 | Shimizu et al. | 34/57 R |
| 3,599,945 | 8/1971 | Helming | 432/14 |
| 3,664,650 | 5/1972 | Weber et al. | 34/57 R |
| 3,834,860 | 9/1974 | Fukuda | 432/106 |
| 3,843,314 | 10/1974 | Ishikawa | 34/57 R |

*Primary Examiner*—John J. Camby
*Attorney, Agent, or Firm*—Learman & McCulloch

[57] ABSTRACT

Find-grained material adapted to be fired in a rotary tube furnace is preheated by being introduced to a vertical chamber in which there is a heating zone at a level lower than that at which the material enters the chamber. Prior to reaching the heating zone fuel is added to the material, after which the material is broken up and subjected to firing at the heating zone. The material thus heated is delivered to the furnace for final firing.

22 Claims, 3 Drawing Figures

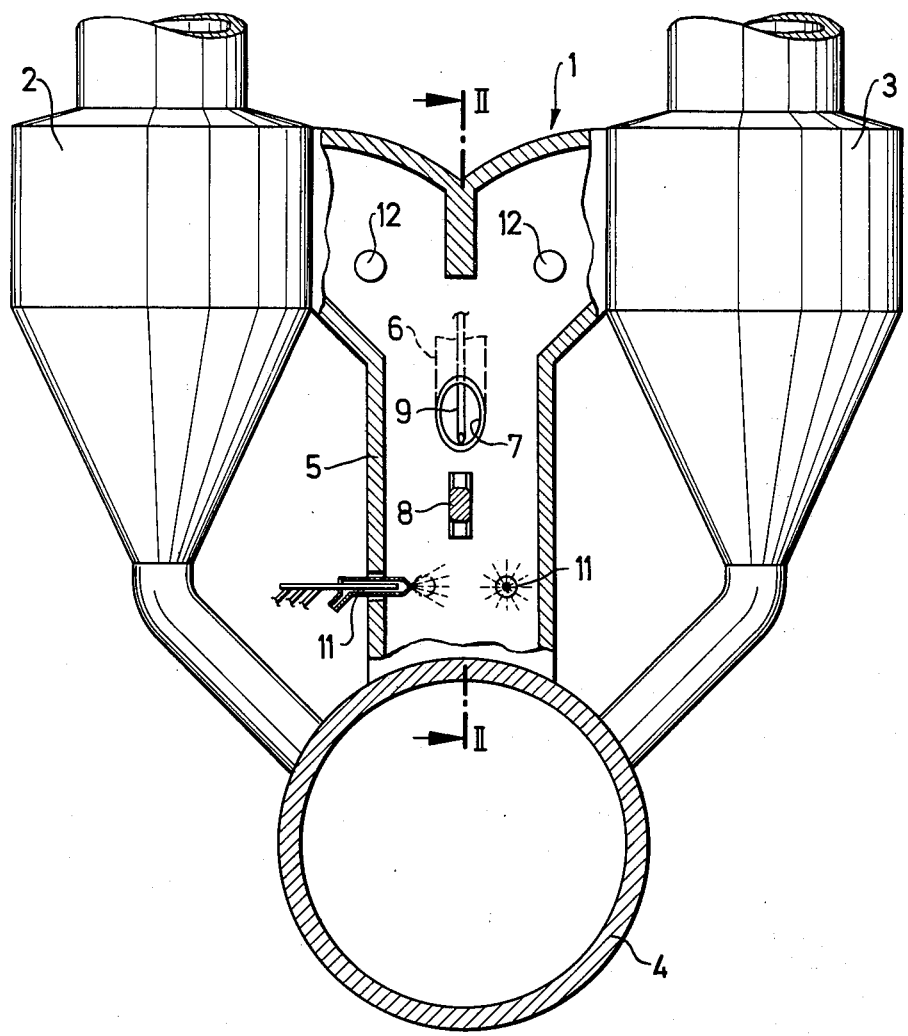

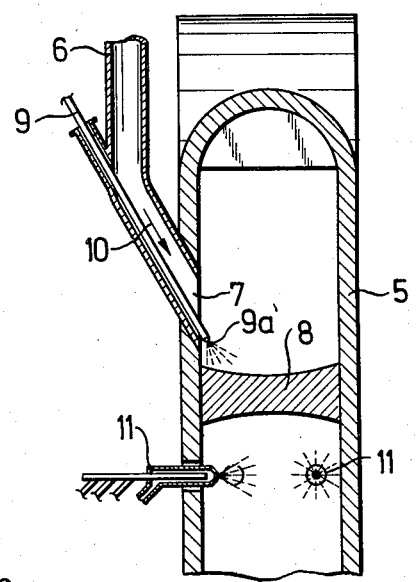
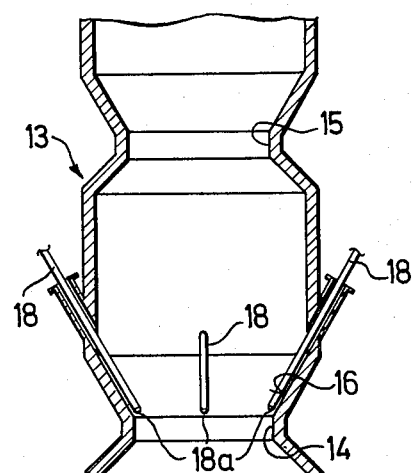
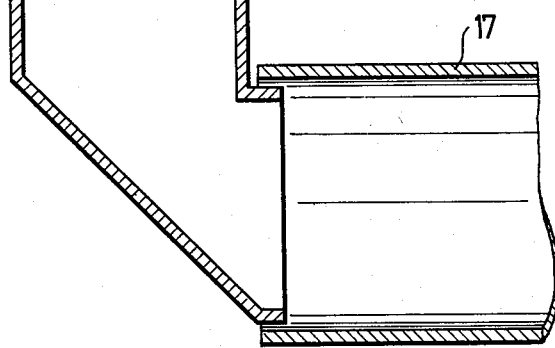

APPARATUS AND METHODS FOR HEAT TREATING FINE-GRAINED MATERIALS

This invention relates to the heat treatment of fine-grained material such as ground raw cement which is warmed in a pre-heater with the hot exhaust gases from a rotary tube furnace, heated and then finally fired in the rotary tube furnace, wherein the material already pre-warmed in at least one zone of the pre-heater after removal from the gas stream is again fed under the influence of its own weight as a dense stream of material into a zone disposed lower down the pre-heater, and wherein the stream of material is again broken up in the oppositely moving gas stream.

In the manufacture of cement, alumina, lime, magnesite, dolomite and the like, the heat treatment of the fine-grained material is frequently effected by first warming the material in a pre-heater comprising one of several cyclones, using the hot exhaust gases from a rotary tube furnace, before the material is given its final firing or sintering in the rotary tube furnace. In such case the greater part of the heat supply must be applied in the rotary tube furnace while only a lesser amount of the total heat energy is applied to the material in the pre-heater. This distribution of the heating function between the rotary tube furnace and the pre-heater is not optimal from the capital cost aspect, since the specific capital costs of the rotary tube furnace are relatively high.

In order to be able to make the rotary tube furnace of smaller dimensions in cross-section and/or length, it has previously been proposed to put a pre-firing zone between the pre-heater and the rotary tube furnace, and in which the pre-warmed material can be heated as high as possible (but without changing from the condition of powdered free-flowing solid into a condition with fluidity reduced by incipient grain coarsening, and possibly melt phase formation).

The particular problem in the construction of such type of pre-firing zone is that extremely uniform supply of fuel to the material is necessary in order to avoid excessive firing of individual particles of material (with all the associated disadvantages such as caking, agglomerate formation, etc.).

In one known method this pre-firing zone comprises a vortex zone directly heated by burners, and from which the material passes into the rotary tube furnace. Another known method uses a firing chamber with tangential entry and exit of the material and fuel. The disadvantages of these known methods lies in the considerable capital cost of the pre-firing zone, so that a considerable part of the saving made in the rotary tube furnace is lost again.

The invention is thus based on the avoidance of these disadvantages by the provision of a method of the type initially referred to, in such manner that the desired uniform heat treatment of the material in the prefiring zone is made possible with very minor expenditure on equipment.

According to the invention fuel in finely divided form is added to the stream of material before it is completely broken down in the stream of gas.

With the method provided by the invention, the gas tube which is in any case present between the rotary tube furnace and the pre-heater is used as a pre-heater or firing chamber, so that no appreciable further capital costs arise from this firing zone. The transfer of a considerable part of the heat transmission operation from the rotary tube furnace to this firing zone enables the rotary tube furnace to be made with appreciably smaller dimensions, and this means a considerable saving in capital costs.

In the tests of the invention it was found that a largely uniform mixing of pre-warmed material with the finely divided fuel is the main pre-condition for the extensive supply of heat energy to the material during the subsequent firing process without individual particles of material being overheated. With the method provided by the invention, the feeding of fuel into the stream of material while it is not yet broken down ensures that combusion conditions are not present, at least immediately on feeding in the fuel. Only when the stream of material mixed with fuel is broken down in the oppositely directed gas stream do combusion conditions then prevail, due to the reduced concentration of material and the increased access of oxygen to the fuel. Since the fuel is added to the stream of material while that stream is still unbroken, the individual fuel particles preferably adhere to the particles of material, and in this way are uniformly distributed over the entire cross-section of the gas tube when the stream of material is broken down. In this way the material is highly and very uniformly heated before it enters the rotary tube furnace.

The oxygen concentration in the gas supplied to the firing zone should be between 5 and 14 percent, and preferably between 8 and 12 percent. The oxygen concentration in the exhaust gases from the rotary tube furnace is preferably adjusted to at least 2.5 percent, (i.e., above the usual $O_2$ content), so that only the additionally required amount of oxygen has to be supplied to the firing zone from another air source (for instance in the form of cooler discharge gas). The entire amount of oxygen needed in the firing zone can also be supplied by the exhaust gases from the rotary tube furnace.

There are various possible ways of supplying the fuel to the stream of material. As compared with simply spraying the fuel on to the material, it is in general more beneficial to dispose the fuel feed point in the stream of material, in order thereby to cause an intimate admixture of fuel and solid particles, before the fuel comes into contact with oxygen in the gas tube.

Basically the fuel may be supplied in the same direction or in counter-flow to the solid material supply. A system has been found particularly advantageous wherein the mouth of the fuel inlet is directed generally in the direction of flow of the solid material.

These and numerous further features of the invention which form the subject of the subsidiary claims will be described below.

FIG. 1 is a vertical section through those parts of a device for carrying out the method of the invention according to one embodiment of the invention;

FIG. 2 is a section on the line II—II of FIG. 1; and

FIG. 3 is a schematic representation of a second embodiment.

The apparatus shown only partly in FIGS. 1 and 2, comprises a pre-heater 1 formed of a number of cyclones and vortex chambers superimposed at different levels, only the two cyclones 2, 3 of the lowest level being shown in FIG. 1. The apparatus also includes a rotary tube furnace 4 whose exhaust gases flow to the two cyclones 2, 3 via a gas pipe 5.

Material is injected into the gas pipe 5 through a feed pipe 6 which comes from a central vortex chamber in the next higher level. A bridge-shaped distributor member 8 is located in the gas pipe 5 below the feed inlet 7.

In the feed pipe 6 is disposed a fuel feeder 9 made in the form of an extractable lance. The mouth 9a of this fuel feeder 9 is directed in the direction of movement (arrow 10) of the stream of solid material, and lies in the vicinity of the inlet (aperture 7) of the feed pipe 6 in the gas pipe 5. In normal operation the mouth 9a of the fuel feeder 9 is thus covered by the stream of material.

In order to stabilize the firing zone, auxiliary burners 11 are provided below the bridge-shaped distributor member 8, with their position and direction so chosen for instance that the fuel supplied by these auxiliary burners is taken into the gas pipe 5 in the form of a horizontal rotary flow.

Two further auxiliary burners 12 are provided in the gas pipe 5 above the inlet aperture 7 is a precaution in the case of breakdowns.

The apparatus includes also means for mutually adjusting the supplies of solid material and of fuel.

The operation of the apparatus in accordance with the invention is as follows:

The material, already well pre-heated in the upper stages of the pre-heater, is fed via the feed pipe 6 into the gas pipe 5. Liquid or solid fuel in finely divided form is meanwhile added via the fuel feeder 9 into the incoming still relatively dense stream of material. The stream of solid material breaks up on entry into gas pipe 5 and especially on striking the distributor member 8. The individual particles of material are then entrained by the stream of gas which is flowing thorugh gas pipe 5 from the bottom upwards, and are fed to cyclones 2 and 3. In the region of and below the distributor member 8 there is formed a heating or firing zone which extends over the entire cross-section of the gas pipe 5, and whose position is stabilized by the auxiliary burners 11. Material broken up by the distributor is heated at this zone and in this manner the solid material is highly heated before it reaches the rotary tube furnace 4 after being separated out in the cyclones 2 and 3.

From the technical aspect there are obviously numerous possibilities for feeding fuel into the stream of solid material in the gas pipe 6. Thus, for example, the fuel feeder 9 can be provided with a number of nozzles distributed in the longitudinal direction. Also the position of the mouth 9a of the fuel feeder 9 can be made adjustable in a known manner so that the operating conditions may be optimized.

FIG. 3 shows schematically a second embodiment wherein the pre-heater 13 consists of a vertical counter-flow shaft having a number of cross-sectional constrictions (e.g., 14, 15) disposed at intervals one above the other and each topped by funnel-like conical surfaces (e.g., 16).

The exhaust gases from the rotary tube furnace 17 are fed into the lower part of this shaft 13.

In the area of the conical surface 16 of the lowermost cross-section constriction 14 in shaft 13 are disposed a number of adjustable lances 18 distributed uniformly round the periphery, and whose mouths 18a lie approximately on the diameter of the cross-sectional constriction 14.

During operation of the plant, exhaust gases from the rotary tube furnace 17 flow from below upwards through the counter-flow shaft; their speed in the area of the cross-sectional constrictions is somewhat greater than in the other areas of the shaft. In the zones of the shaft between successive constrictions, the solid material fed from above is separated from the turbulent gas stream, and mostly slides along the cone surfaces (e.g., 16) in annular form to the next constriction in the cross-section. When this stream of solid material then breaks through the constriction, it again meets the rising stream of gas, in which it is again broken down.

In accordance with the invention, fuel (especially liquid or solid fuel) in finely divided form is now fed into the stream of solid material which is flowing along the conical surface 16 of the constriction 14 in the counter-flow shaft, so that fuel and solid material are intensively and uniformly mixed with each other in the area of the cross-sectional constriction, before combustion takes place (after breaking up the stream of material in the area below the constriction), so that the solid material is still further heated before its entry into the rotary tube furnace 17.

What is claimed is:

1. A method of preheating fine-grained material prior to its discharge to a furnace from which hot combustion gases are exhausted in a stream, said method comprising introducing said stream of gases at a first level to a preheater; introducing fine-grained material to said preheater in the path of said stream of gases, said material being introduced to said preheater at a second level above that at which said stream of gases in introduced to said preheater whereby said material may move gravitationally in a direction toward said first level; adding fuel to said material under non-combustion conditions; and subsequently combusting said fuel at a firing zone in said preheater located between said first and second levels s to preheat said material.

2. A method according to claim 1 wherein said stream of gases has an oxygen concentration of between 5 and 14 percent.

3. A method according to claim 1 wherein said stream of gases contains at least 2.5 percent oxygen.

4. A method according to claim 1 wherein said fuel is added to said material substantially simultaneously with the introduction of the latter to said pre-heater.

5. A method according to claim 1 including distributing said material over substantially the cross-sectional area of said pre-heater between the time that fuel is added to said material and the time said material reaches said firing zone.

6. A method according to claim 1 wherein said material is introduced to said pre-heater in a substantially solid stream.

7. A method according to claim 6 wherein said fuel is added to said stream of material.

8. A method according to claim 5 wherein said material reaches said firing zone in annular form and wherein said fuel is added to said material while the latter is in said annular form.

9. A method of preheating fine-grained material prior to its discharge to a furnace, said method comprising establishing an upward flow of gas through a preheater; introducing fine-grained material in a dense stream to said preheater in the path of said gas and at a level between the upper and lower ends of said preheater whereby said material may move gravitationally downward; adding fuel to said stream of material; breaking up said stream of material following the addition of fuel thereto; and combusting said fuel following the breaking up of said stream of material to preheat said material.

10. Apparatus for preheating fine-grained material prior to its discharge to a furnace from which hot combustion gases are exhausted in a stream, said apparatus comprising a preheater; means communicating with said preheater at a first level for introducing said stream of gases to said preheater; material inlet means communicating with said preheater at a second level above said first level for introducing a stream of fine-grained material to said preheater, whereby said material may move gravitationally in a direction toward said first level; fuel feeder means communicating with said preheater for adding fuel to the stream of material introduced to said preheater; means for combusting said fuel in said preheater at a firing zone between said first and second levels to preheat said material; and means for discharging preheated material and said stream of gases from said preheater.

11. Apparatus according to claim 10 including material distributing means in said preheater at a level between said inlet means and said firing zone.

12. Apparatus according to claim 10 wherein said means for combusting said fuel comprises burner means.

13. Apparatus according to claim 10 wherein said inlet means comprises a tube through which said material may pass in a substantially solid stream, and wherein said fuel feeder means has a mouth located in a position to be covered by said stream.

14. Apparatus according to claim 13 wherein said mouth is directed in the direction of movement of said stream.

15. Apparatus according to claim 10 wherein said inlet means has a material exit end and wherein said fuel feeder means has a mouth located adjacent said exit end.

16. Apparatus according to claim 10 including material distributing means between said inlet means and said firing zone.

17. Apparatus according to claim 10 including burner means in said pre-heater at said firing zone.

18. Apparatus according to claim 17 including auxiliary burner means in said pre-heater at a level above said inlet means.

19. Apparatus according to claim 10 wherein said fuel feeder means comprises at least one lance adjustably carried by said pre-heater.

20. Apparatus according to claim 10 wherein said pre-heater has a number of vertically spaced, cross-sectional constrictions topped by funnel-shaped surfaces.

21. Apparatus according to claim 20 wherein said fuel feeder means is located in the vicinity of the funnel shaped surface of the lowermost constriction.

22. Apparatus according to claim 21 wherein said fuel feeder means comprises a number of lances having their mouths lying substantially on the diameter of said lowermost constriction and spaced about the periphery thereof.

* * * * *